Feb. 19, 1957     C. W. EILERMANN     2,781,605

FISH HOOK

Filed Sept. 20, 1955

INVENTOR.
Charles W. Eilermann
BY
His Attorney

United States Patent Office 2,781,605
Patented Feb. 19, 1957

2,781,605

FISH HOOK

Charles W. Eilermann, Cincinnati, Ohio

Application September 20, 1955, Serial No. 535,452

3 Claims. (Cl. 43—44.2)

My invention relates to fish hooks and more particularly to hooks such as are used in fishing for larger types of fish where a minnow may be secured to the hook for baiting.

It is the principal object of my invention to provide a fish hook having barbs at its opposite ends which may be adjusted to secure a minnow.

Another object of my invention is to provide a means of clamping a minnow between the adjustable barbs.

Another object of my invention is to provide a bait hook which is extremely simple in operation and requires a minimum number of manipulations in applying the bait and will firmly hold the bait in its selected position.

Another object of my invention is to provide a fish hook to which the bait may be secured which does not require that the minnow be forced onto the barb.

Other objects of my invention will be apparent from the detailed description which follows, in which.

Figure 1:
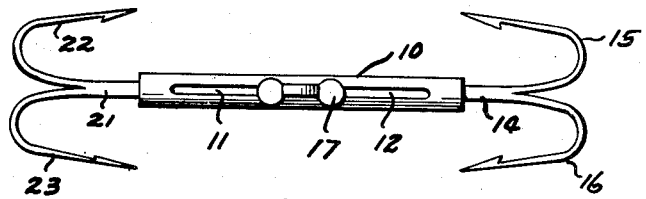
Fig. 1 is a top plan view of the fish hook with the hook elements located at their innermost positions.

My invention is especially intended for use with small fish for bait and it is especially desired that the bait be secured to the hook. In particular, it is desirable that the bait be positioned on the hook so as to simulate the appearance of a live fish as the hook is drawn through the water. In using my invention, the minnow is positioned between the pair of barbs at opposite ends of the hook and is held by adjusting the barbs so that they pierce the head and tail portions of the minnow after the minnow has been secured to the hook by means of a pivoted member secured in a plane below the plane of the barbs and piercing the minnow. In the drawing the same reference numerals refer to the same parts throughout the several views.

Figure 2:
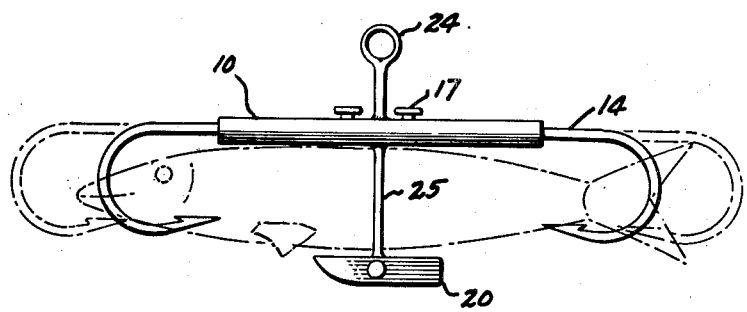
Fig. 2 is a side elevational view of the hook shown in Fig. 1 with the hook elements shown in dashed lines at their outermost positions, a fish bait also being shown in dashed lines.
Figure 3:
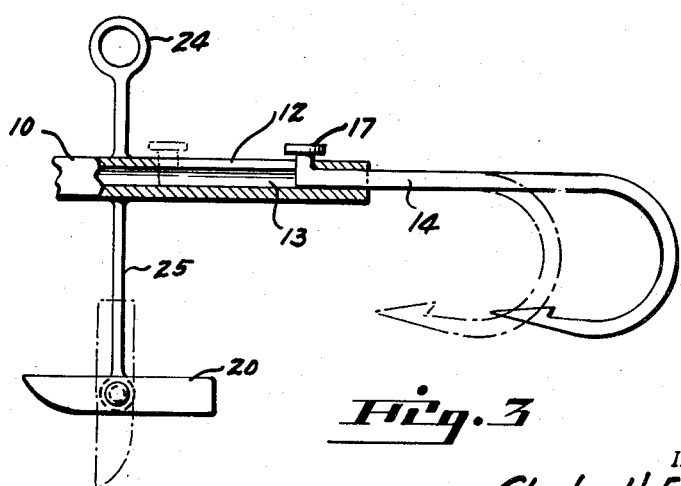
Fig. 3 is a fragmentary elevational view, partially in section of the right portion of the hook shown in Fig. 2, showing the clamping member in its bait entering position in solid lines and one hook element at its innermost location in dashed lines.

In Fig. 1 a slotted sleeve 10 is provided, having a pair of colinear slots 11 and 12 in the wall thereof. The sleeve has an axial coextensive hollow portion 13 into which the shank 14 may be slidably secured. Each shank 14 is provided with a pair of barbs 15 and 16, and has a knob or button 17 which projects through one of the slots. Each hook may be moved axially in the sleeve and the movement thereof is limited by the length of the slots 11 and 12. An eye 24 is mounted on and above the midportion of the sleeve to which is secured the fish line. Below the eye on the under side of the shaft I provide a connecting member 25 having a clamp member 20. This knife-like member 20 is forced through the minnow and the knife member is turned 90 degrees to secure the minnow in its clamped position, adjacent the side of the sleeve 10, as shown in Fig. 2.

My device may be assembled by providing a sleeve 10 formed from a piece of steel tubing with an inside diameter of such size to accommodate the shank of the hook. The slots 11 and 12 are milled into the tube. The shank 14 is bent at its end remote from the barb through the slot and flattened or bent to form an operating button 17 which also prevents it from slipping from the sleeve. The eye 24 and connecting member 25 may be attached to the tubing 10 by brazing. If it is desired a hole may be drilled through the tube and the eye and connecting member mounted within the drilled hole and the clamp 20 secured to the end of the connecting member. The member would be held in position by welding or brazing at the points where it enters the tube.

Having thus described my invention, I claim:

1. A fish hook, having a pair of colinear hook elements and including an eye, a slotted sleeve, each element having a shank and a barb, at one end and a right angle projection terminating in an operating button at the opposite end thereof the projection being adapted to cooperate with said slotted sleeve, to provide a bait holding compound fish hook said hook elements being slidable by means of said button toward and away from each other in the sleeve.

2. A fish hook having a pair of colinear hook elements and including an eye, a slotted sleeve, each element having a shank and a barb at one end and a right angle projection terminating in an operating button at the opposite end thereof the projection being adapted to cooperate with said slotted sleeve, to provide a bait holding compound fish hook, said hook elements being slidable by means of said button toward and away from each other in the sleeve, and a connecting member opposite said eye having a clasp for holding a bait.

3. A fish hook having colinear hook elements and including an eye, a slotted sleeve, each element having a shank and a barb at one end thereof and being slidable in said sleeve, each element having a projection at the end of said shank remote from the barb which is adapted to cooperate with said slotted sleeve to provide a bait holding compound fish hook having hook elements that are slidable toward and away from each other in the slotted sleeve.

References Cited in the file of this patent

UNITED STATES PATENTS

| | | |
|---|---|---|
| 353,412 | Behrens | Nov. 30, 1886 |
| 740,416 | Gebhardt | Oct. 6, 1903 |
| 2,663,966 | De Mello | Dec. 29, 1953 |

FOREIGN PATENTS

| | | |
|---|---|---|
| 749,308 | France | May 2, 1933 |